United States Patent [19]
McRobert

[11] 3,828,534
[45] Aug. 13, 1974

[54] ARTICLE PICKUP MACHINE
[75] Inventor: Leon R. McRobert, Ocoee, Fla.
[73] Assignee: FMC Corporation, San Jose, Calif.
[22] Filed: Apr. 27, 1972
[21] Appl. No.: 248,146

[52] U.S. Cl............................................. 56/328 R
[51] Int. Cl............................................ A01d 51/00
[58] Field of Search............ 56/328 R, 327 R, 13.6, 56/344, 345, 15.6; 171/28

[56] References Cited
UNITED STATES PATENTS

| | | | |
|---|---|---|---|
| 2,515,966 | 7/1950 | Polisena | 198/126 |
| 2,750,726 | 6/1956 | Boucard et al. | 56/15.6 |
| 2,901,048 | 8/1959 | Krukowski | 171/28 |
| 3,198,259 | 8/1965 | Manuel | 171/28 |
| 3,353,342 | 11/1967 | Hill et al. | 56/327 R |
| 3,387,442 | 6/1968 | Henson | 328R |
| 3,412,840 | 11/1968 | Laikam | 198/8 |
| 3,511,038 | 5/1970 | Gates et al. | 56/327 R |
| 3,678,677 | 7/1972 | Miller et al. | 56/327 R |
| 3,690,383 | 9/1972 | Malley et al. | 56/327 R X |
| 2,828,825 | 4/1958 | Johnson | 56/345 X R |

*Primary Examiner*—Russell R. Kinsey
*Attorney, Agent, or Firm*—A. J. Moore; C. E. Tripp

[57] ABSTRACT

A mobile article pickup machine for picking up rollable articles such as citrus fruit from a surface which varies in contour both longitudinally and laterally of the path of movement of the machine. The machine includes a rigid elevator frame that is connected to the vehicle chassis by a three point pivotal suspension and has its forward end supported for free floating action on the support surface. A steeply inclined bar elevator is supported by the frame for lifting citrus fruit from the ground or supporting surface, and a weighted draper bears against the fruit and causes the fruit to roll and become partially cleaned as it is moved up the elevator. The weights prevent movement of the fruit down the elevator. A trash separator receives the fruit from the elevator and serves to separate the large trash, non-rollable fruit, and fine debris from the rollable marketable fruit.

22 Claims, 12 Drawing Figures

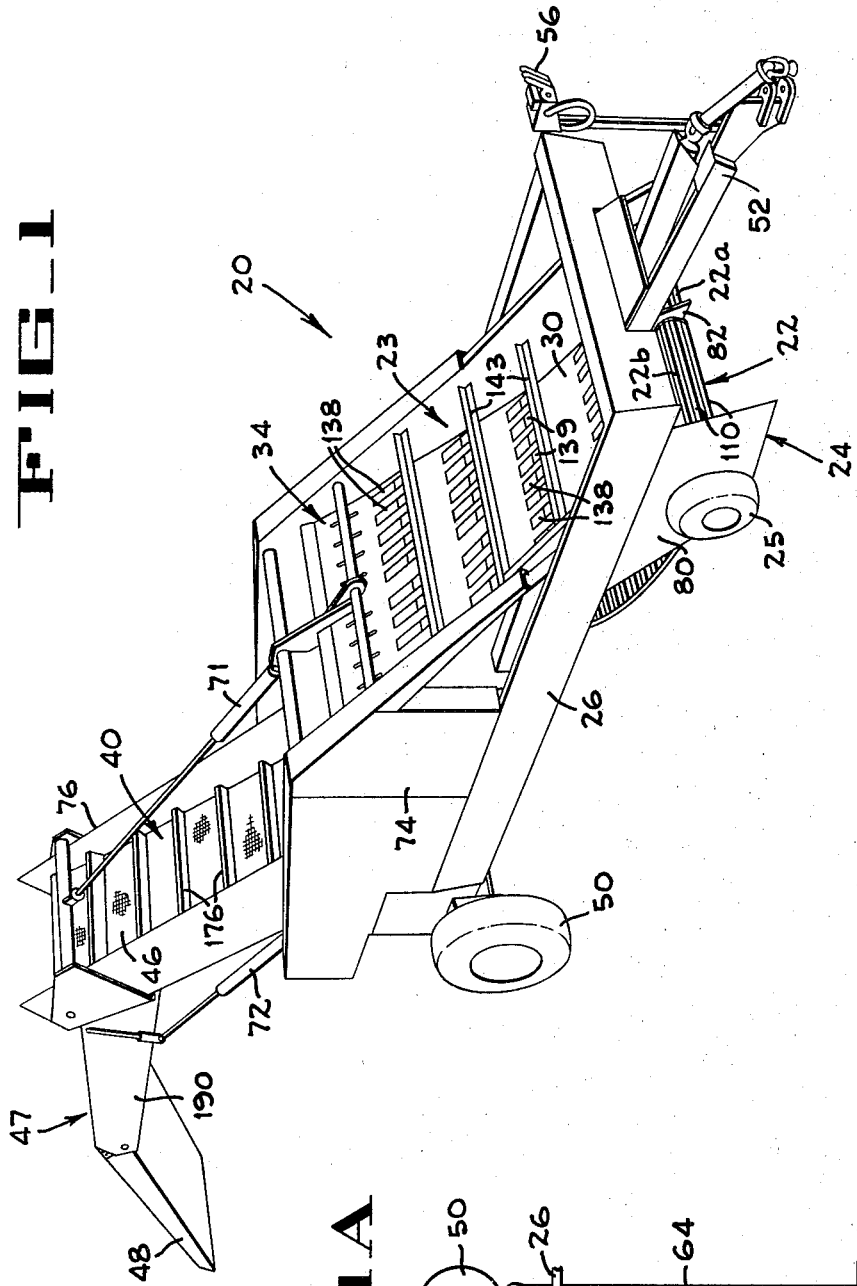
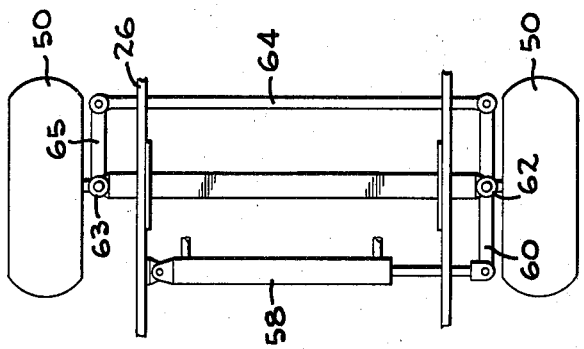

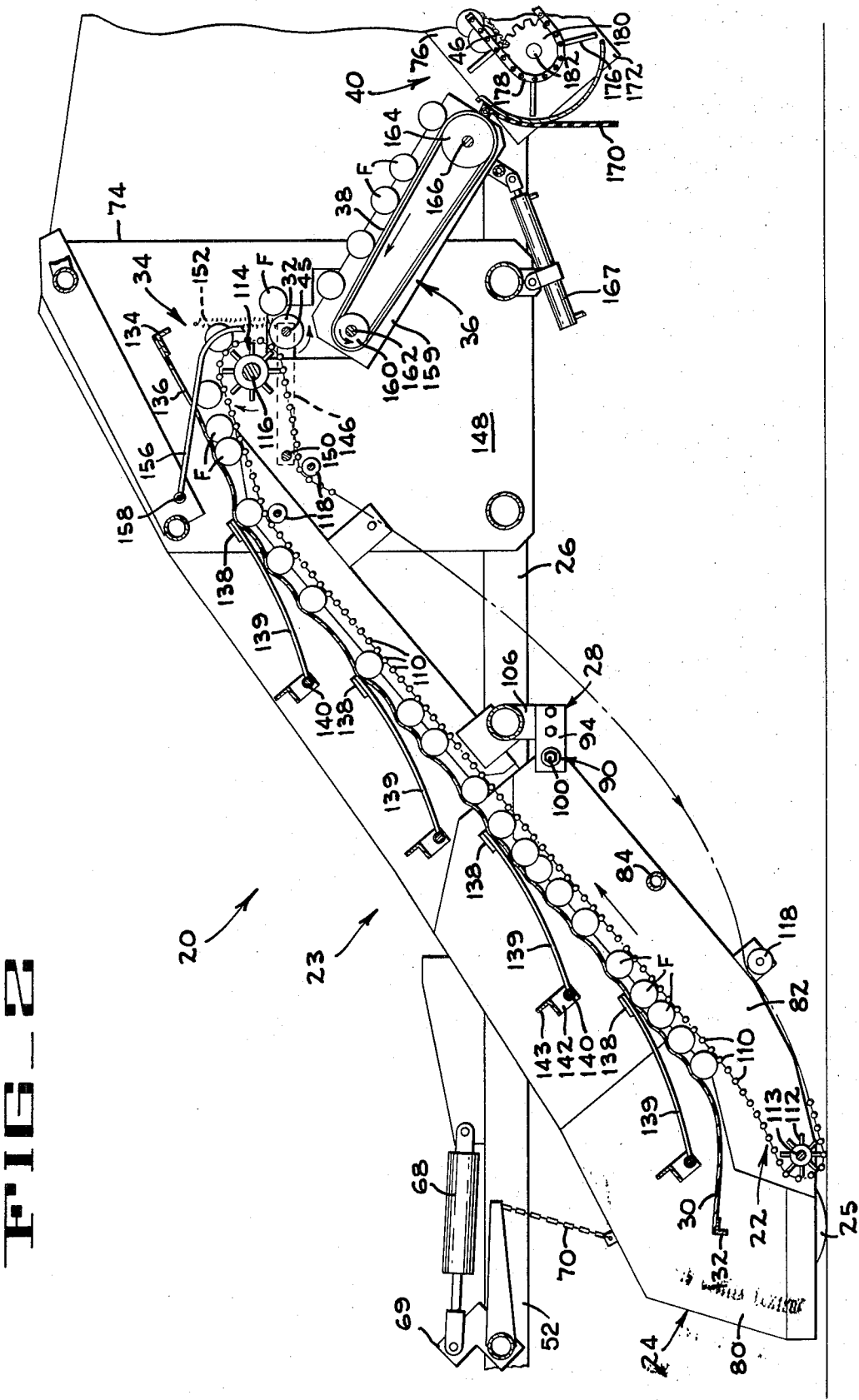

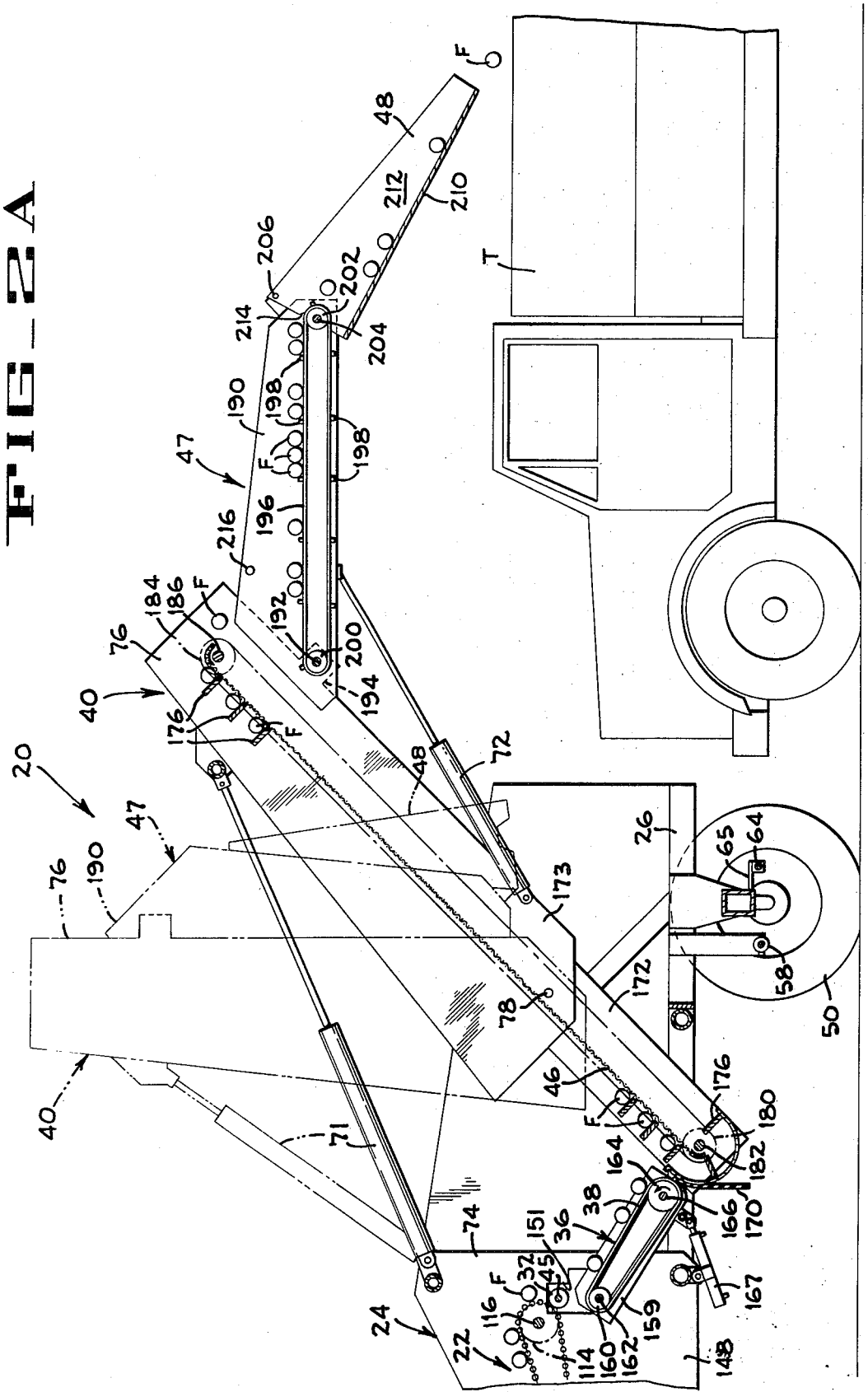

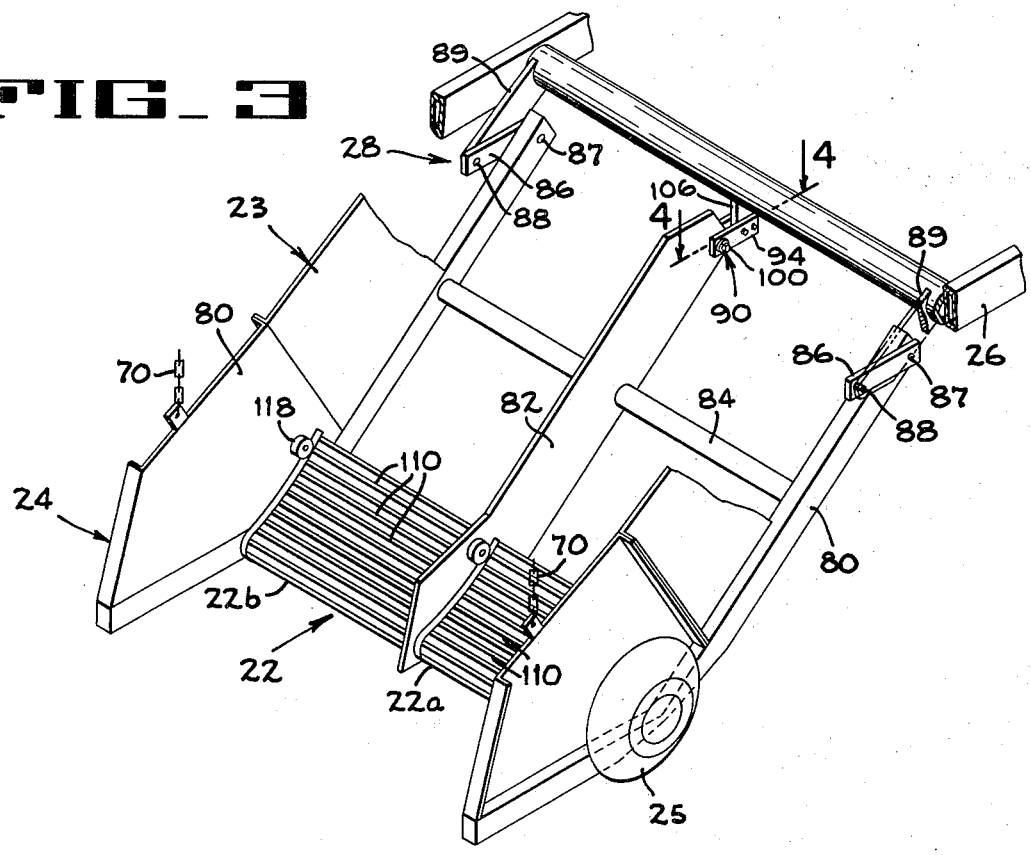
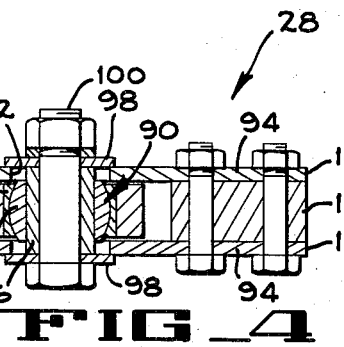
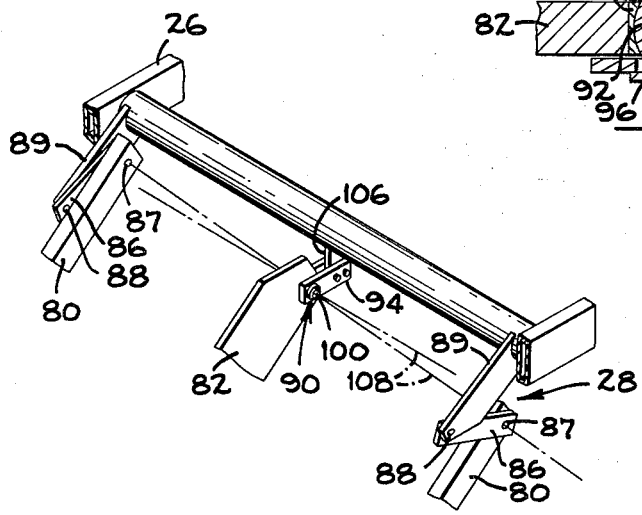

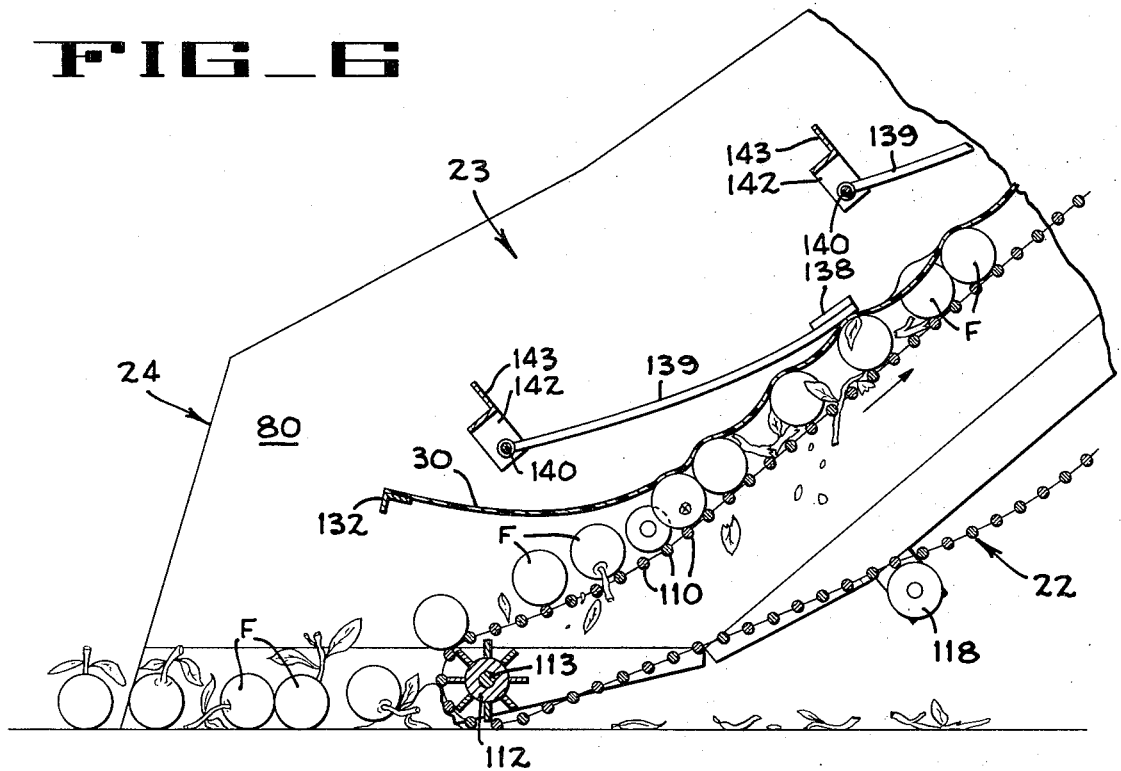
FIG_6
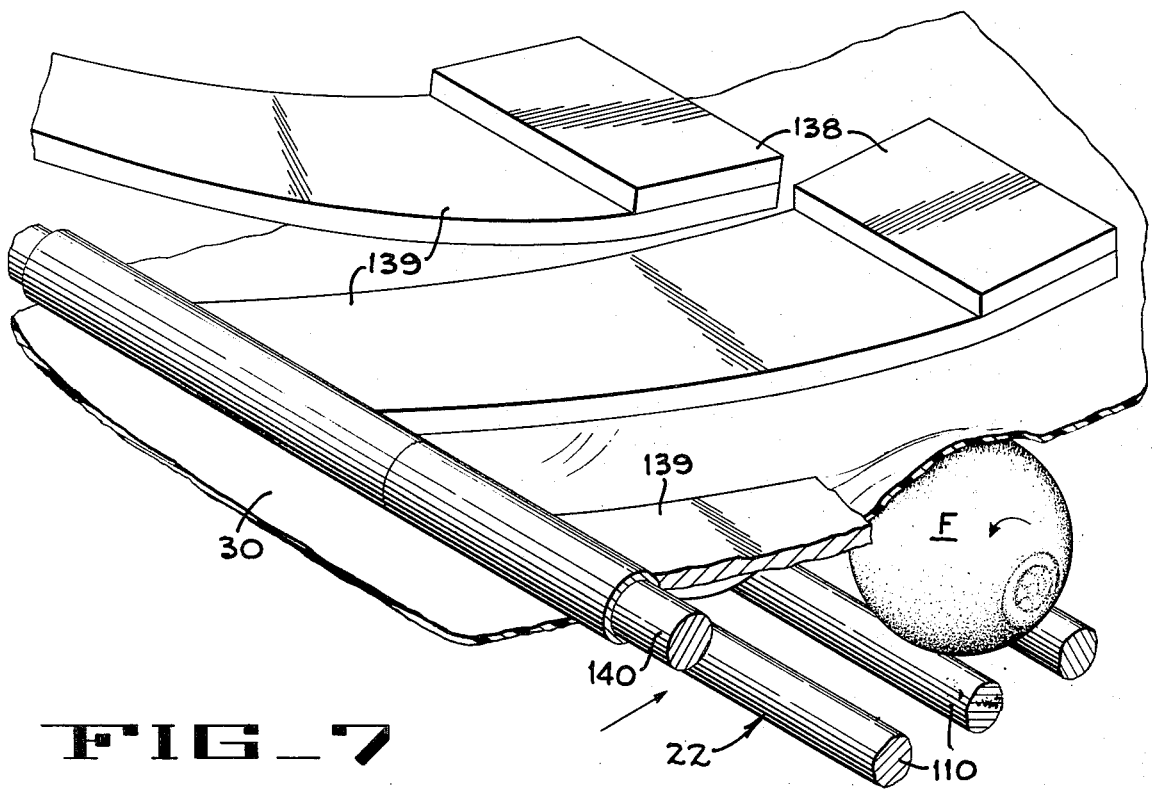
FIG_7

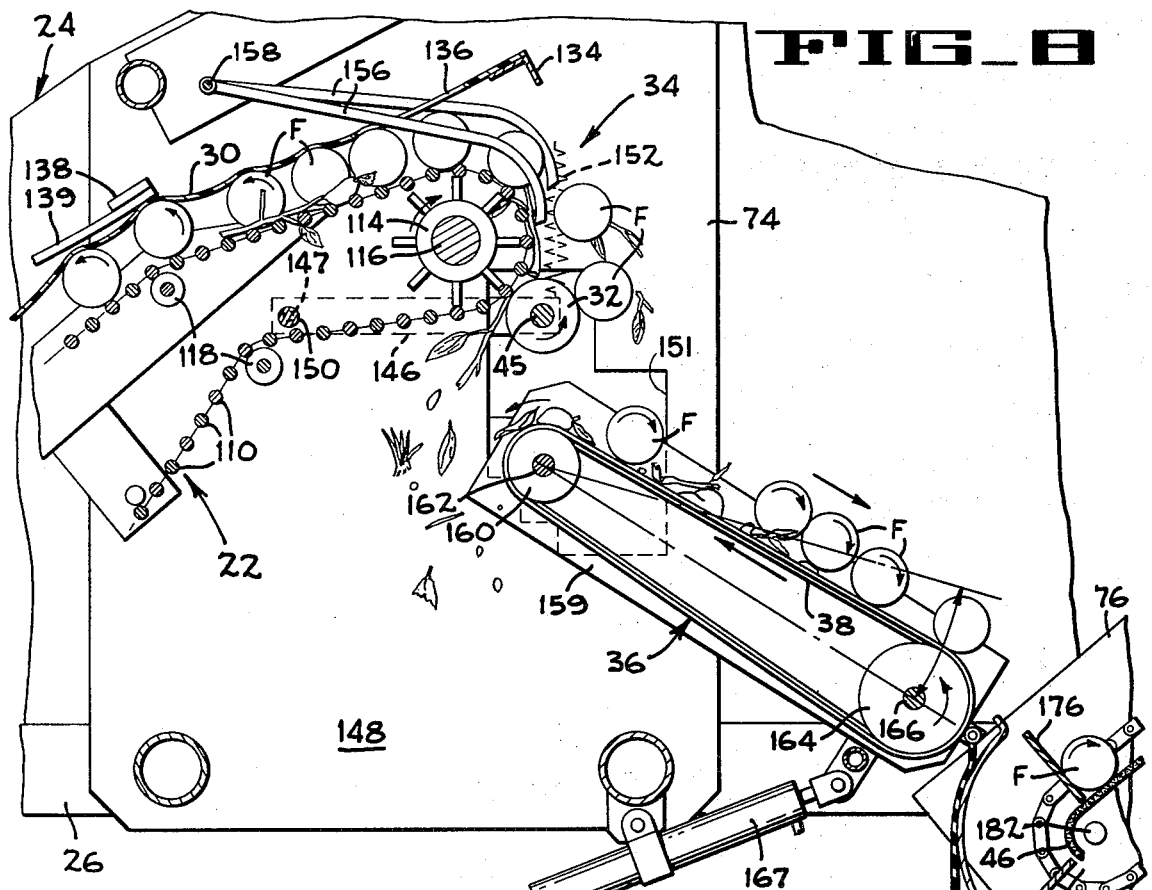
FIG_8
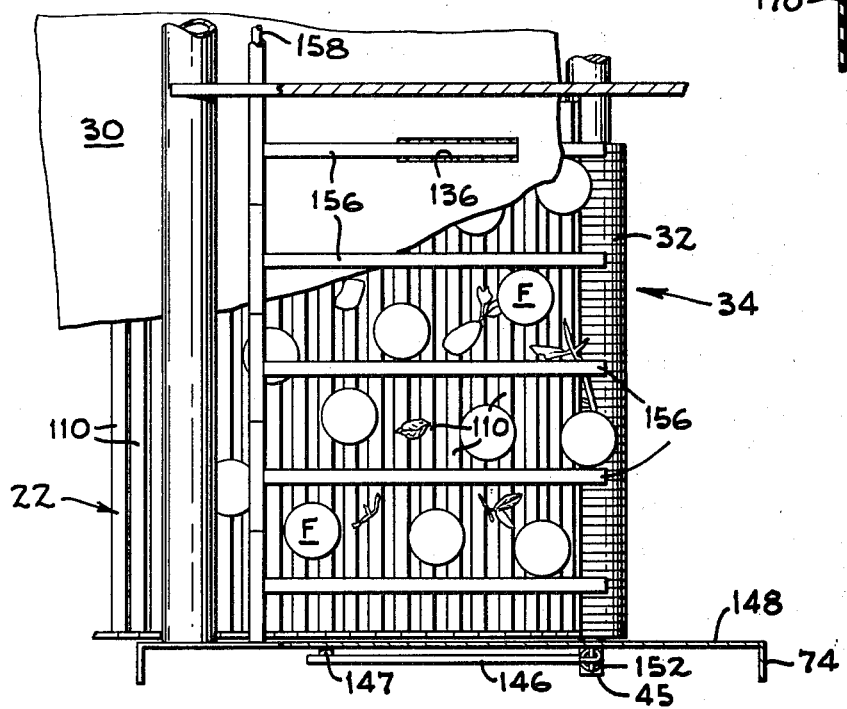
FIG_9

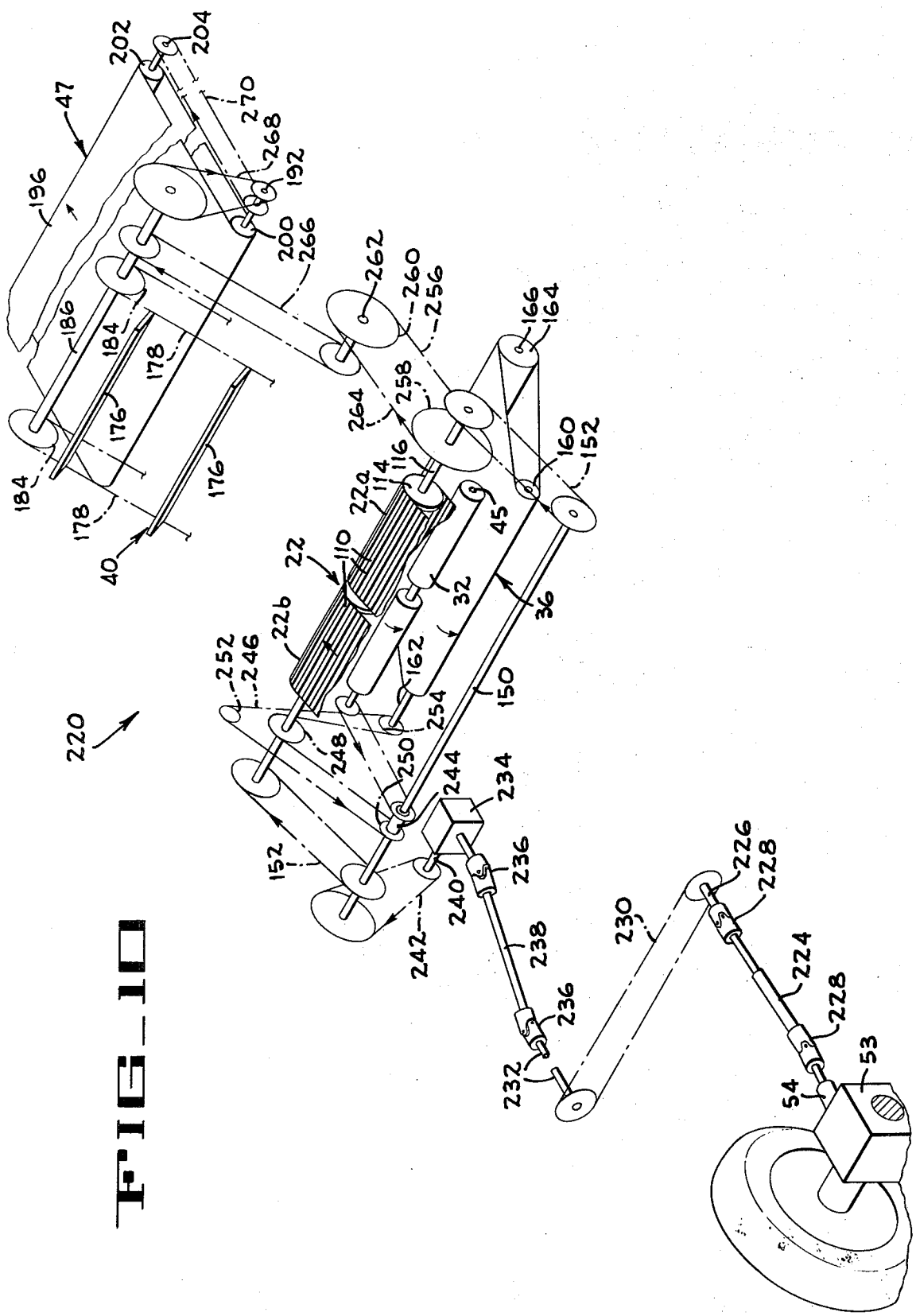

ARTICLE PICKUP MACHINE

BACKGROUND OF THE INVENTION

1. Field of the Invention

This invention pertains to the article pickup and cleaning art; and more particularly relates to a machine for picking up marketable fruit or the like, along with debris and unmarketable fruit, from ground which varies in contour, and then cleaning the debris and defective fruit from the marketable fruit.

2. Description of the Prior Art

Article pickup machines with elevators which follow varied ground contours are well known in the art. The prior art structures for mounting the elevators to permit the forward lower edge of the elevator to raise and lower and also to follow the transverse contour of the ground included, in many cases, either a non-rigid flexible elevator frame or a large and complicated pivot ring connection between the elevator frame and the vehicle chassis. Also, certain of the prior art devices which were adapted to handle rollable articles were unduly long and cumbersome because the elevators were not steeply inclined but were placed at low inclinations to prevent the articles from rolling down the elevator.

An additional problem not adequately solved by the prior art device was the provision of a trash cleaning device which would discharge large debris, small debris, and defective non-rotatable fruit from the marketable fruit to be collected.

SUMMARY OF THE INVENTION

The pickup machine of the present invention comprises a mobile vehicle movable along a predetermined path for picking up rollable articles. Many types of articles may be picked up by the machine, however, the preferred embodiment of the machine has been designed to pick up citrus fruit from ground which may vary in contour both longitudinally and laterally of the path of movement of the machine. The fruit is preferably placed in windrows prior to being picked up by the subject machine, and will hereafter be referred to as fruit although it is understood that many other types of articles may be picked up by the machine.

A steeply inclined bar elevator is mounted on a rigid elevator frame having a pair of ground engaging wheels on the forward end for following the undulations of the ground. A centrally disposed ball joint received in the slot, and a pair of radius rods serve to simply and inexpensively pivot the rear upper end of the elevator frame to the vehicle chassis.

In order to aid in moving the fruit up the steeply inclined elevator, a flexible draper is anchored in position over the upper run of the elevator and has weights associated therewith to permit upward movement of the fruit but prevent rolling of the fruit down the elevator. The fruit is rolled against the draper by the elevator causing the fruit to move upwardly at about half the speed of the elevator, and also causing debris clinging to the fruit to be frictionally disengaged therefrom. A trash separator cooperates with the elevator to further clean or separate foreign matter from the marketable fruit. The trash separator includes a clamping roller which clamps large twigs, leaves, grass and like debris and discharges this debris from the path of movement of the fruit. The fruit, including additional debris not captured by the clamping roller, falls upon an inclined cleaning conveyor having its article supporting run moving upwardly. The inclination of the cleaning conveyor may be adjusted and is sufficient to cause the debris and damaged or rotted fruit having flat spots or the like therein to remain on the conveyor and move over the upper end thereof. The marketable fruit is sufficiently firm and rollable to roll down the inclination of the cleaning conveyor for further cleaning and subsequent conveyance to a collecting means.

The pickup machine is preferably towed by a tractor at 1 to 1-½ MPH while picking fruit and is powered from the power take-off of the tractor. The machine is further provided with hydraulic power means for raising the pickup elevator off the ground and for pivoting a loading conveyor and a loading chute from a retracted transport position to a position wherein bulk bin trucks such as dump trucks capable of handling between about 2-½ – 3-½ tons following the machine are loaded with the marketable fruit in about 4 to 6 minutes. The rear wheels of the machine are also steerable to improve its mobility.

It is, therefore, one object of the present invention to provide an improved machine for picking up rollable articles from uneven surfaces.

Another object is to provide a connecting mechanism for pivotally connecting an elevator frame to a vehicle chassis.

Another object is to provide a draper disposed over a steeply inclined elevator for holding the articles being conveyed against the elevator.

Another object is to provide an improved trash cleaning mechanism.

BRIEF DESCRIPTION OF THE DRAWINGS

FIG. 1 is a perspective of the pickup machine of the present invention illustrated in operative position but with the towing vehicle and the fruit receiving bulk truck not being illustrated.

FIG. 1A is a schematic view in plan illustrating the apparatus for steering the rear wheels of the vehicle.

FIG. 2 is a diagrammatic vertical central section of a front portion of the machine of FIG. 1 with parts being shown in their operative pickup position.

FIG. 2A is a diagrammatic vertical central section of the rear portion of the machine.

FIG. 3 is a diagrammatic perspective of the pickup elevator frame and its pivotal connection to the vehicle chassis, with only a portion of the chassis being shown.

FIG. 4 is an enlarged section taken along lines 4—4 of FIG. 3 illustrating a ball connection.

FIG. 5 is a perspective similar to the upper portion of FIG. 3 but illustrating the parts as they appear when the front end of the frame is transversely inclined.

FIG. 6 is an enlarged operational view in vertical section illustrating a draper which holds the fruit against the elevator.

FIG. 7 is an enlarged perspective illustrating the draper of FIG. 6 and two of the weights.

FIG. 8 is an enlarged operational view in vertical section illustrating the operation of the trash separator.

FIG. 9 is a plan view of the separator of FIG. 8 illustrating the trash hold-down fingers.

FIG. 10 is a diagrammatic perspective illustrating the drive mechanism.

DESCRIPTION OF THE PREFERRED EMBODIMENT

The article pickup machine 20 (FIGS. 1, 2 and 2A) of the present invention is specifically designed to handle citrus fruit F which has been placed in windrows on ground that is not perfectly flat but has the usual undulations therein. It will be understood, however, that other types of fruit, nuts, and non-agricultural articles may be picked up by the machine 20 and loaded into a bulk truck T or the like which follows the machine.

In general, the pickup machine 20 comprises a spaced bar pickup elevator 22 of a pickup elevating mechanism 23. The elevator 22 has its forward end mounted on a rigid pickup elevator frame 24 that has ground engaging wheels 25 on its forward end to cause the frame to follow the varying ground contours. The rear end of the elevator frame 24 is mounted to the chassis 26 of the machine 20 by a three point pivotal suspension mechanism 28 which allows the rigid frame to freely follow the ground undulations. The fruit picked off the ground is held on the elevator 22, which is steeply inclined, by a weighted draper 30 which causes the fruit to roll and move up the elevator at about one-half the speed of the elevator. The rolling of the fruit dislodges dirt therefrom and partially cleans the same. Debris, such as twigs, grass, and dirt clods is also carried up the elevator with the fruit F, and the large debris is separated from the fruit by a clamping or devining roller 32 (FIG. 2) of a trash separator 34. The fruit F, including defective fruit such as partially rotted or deformed fruit, and other debris is discharged upon a rough surfaced cleaning belt conveyor 36 which is inclined and has its upper run 38 driven upwardly at a rate which will allow the marketable fruit which is readily rollable to roll over off the lower end into a cross-bar elevator 40, and causes the debris including defective fruit which resists rolling to move upwardly for discharge upon the ground over the upper end of the cleaning belt conveyor 36. The cross-bar elevator 40 then moves the collected fruit up over a screen 46 for further cleaning. The cleaned fruit F is then advanced by a conveyor 47 into a chute 48 for gravitational discharge into the truck T (FIG. 2A).

More particularly, the pickup machine 20 (FIGS. 1, 2 and 2A includes the chassis 26 which is supported by steerable rear wheels 50 and has its front end or tongue 52 connected to the draw bar of a tractor 53 (FIG. 10). The several conveyors and elevators are driven from the power take-off 54 of the tractor, and the several hydraulically controlled components of the machine 20 are powered from the conventional tractor hydraulic system (not shown) and are independently controlled by a conventional control unit 56 which is shown supported on the machine 20 in FIG. 1 but is clamped on the tractor within easy reach of the operator during normal operation.

As diagrammatically illustrated in FIG. 1A the rear wheels 50 are steered by a hydraulic cylinder 58 connected between the chassis 26 and a lever 60. The lever is connected to one wheel supporting spindle 62, which spindle is pivotally connected to the other wheel supporting spindle 63 by a tie bar 64 and cooperating levers 65. Thus, the operator may actuate one of a plurality of valves in the control unit 56 (FIG. 1) to pivot the two rear wheels 50 in unison about vertical pivot axes thereby materially shortening the turning radius of the pickup machine 20. During sharp turns and when the vehicle is transported from place to place, the operator lifts the front end of the elevator frame 24 off the ground by actuating another valve in the hydraulic control unit 56 which operates the pair (only one being shown in FIG. 2) of hydraulic cylinders 68, each cylinder being connected between the chassis 26 and one arm of a bell crank 69 journaled on the chassis. The other arm of the bell crank is connected to the forward end of the elevator frame 24 by a link such as a chain 70. Also, during transportation of the pickup machine over long distances such as from one grove to another, the operator may actuate other hydraulic valves in the hydraulic control unit 56 to activate hydraulic cylinders 71 and 72 (FIG. 2A). The cylinder 71 is connected between a sub-frame 74 rigid with the chassis 26, and a two-piece frame 76 of the cross-bar elevator 40 causing the upper portion of the frame 76 to pivot about a pivot axis 78 from a plurality of rearwardly inclined truck loading positions to a substantially vertical transport position as shown in dotted lines in FIG. 2A. The hydraulic cylinders 72 are connected between the elevator frame 76 and the loading conveyor 47 and moves the conveyor 47, along with the chute 48, between a plurality of truck loading positions to distribute the fruit evenly in the body of the truck T, and a substantially vertical transport position as illustrated in FIG. 2A. In the claims, the term "mobile main frame" will be understood as including the chassis 26 with its sub-frame 74.

An important feature of the invention is the pickup elevator frame 24 (FIGS. 2, 3, 4 and 5) and the three-point pivotal suspension mechanism 28 for mounting the pickup elevator frame to the chassis 26 so that the front end of the pickup frame may follow the contour or varying undulations of the ground. The pickup elevator frame 24 is of rigid construction and includes a pair of side walls 80, a central wall 82, and a plurality of cross members 84 (only one being shown in FIG. 3) all rigidly connected together. The wheels 25 are journaled to the associated side walls 80 and support the lower front portions of these walls at approximately ground level.

The pivotal suspension mechanism 28 comprises a pair of radius rods 86 each having one end pivoted to the upper portions of the associated side walls 80 by pins 87. The opposite end of each radius rod is pivoted by pins 88 to brackets 89 which are rigidly secured to the chassis 26. The central member 82 (FIG. 4) of the elevator frame 24 has the sleeve 89' of a ball joint assembly 90 rigidly connected thereto, which sleeve receives a ball segment 92 for universal movement. The ball segment 92 is connected to a yoke 94 by a shouldered sleeve 96, cooperating washers 98, and a bolt 100, which sleeve 96 is slidably received in slots 102 defined in the yoke 94. The yoke 94 is formed from two bars 104 bolted to a bracket 106 that is rigid with the chassis of the vehicle.

As illustrated in FIG. 3, when the chassis 26 is transversely parallel to the front end of the pickup elevator frame 24, the radius rods 86 are parallel and lie in a common plane, which plane includes the longitudinal axes of the slots 102. However, when the forward end of the pickup elevator frame 24 is not transversely parallel to the chassis, the radius rods 86 counter swing as indicated in FIG. 5 causing the ball joint assembly 90 to move forwardly in the slots 102 thus allowing the forward end of the rigid elevator frame to pivot freely, both up and down and transversely, relative to the chassis 26. It will also be noted from FIG. 5 that a common linear pivot axis 108 passes through both pivot pins 87 and the axis of the ball joint 90 for any degree of pivotal movement of the forward end of the frame 24 relative to the chassis 26.

The pickup elevating mechanism 23 includes the frame 24 and the bar elevator 22 which is driven along with certain other components of the machine as will be described hereinafter. The elevator 22 includes two identical sections 22a and 22b as best shown in FIG. 3. Each section is constructed from a plurality of spaced bars 110 interconnected at their ends to define an endless elevator. Each section is trained around a lower vaned pulley 112 (FIG. 2) keyed to a shaft 113 journaled in the forward end of the pickup frame 24, and around an upper vaned pulley 114 keyed to a shaft 116 journaled on the sub-frame 74. A plurality of idler sprockets 118 are provided to aid in supporting the elevator sections in their desired paths of movement.

In order to lift the fruit from the ground onto the elevator 22, the lower vaned pulley 112 is of relatively small diameter. As the elevator bars 110 advance forwardly and then upwardly and over the pulley 112, the bars move a shallow ridge of dirt ahead of the lower pulley 112 to provide a dirt ramp for more easily lifting the fruit from the ground as illustrated in FIG. 6.

An important feature of the pickup elevating mechanism 23 is the provision of the draper 30 (FIGS. 2, 6 and 7) which overlies the elevator 22 and serves to apply a force upon the fruit F to prevent the fruit from gravitating down the steeply inclined elevator. The draper 30 performs the additional function of rolling the fruit thus causing the fruit to move up the elevator at about one-half the speed of the elevator, and also dislodge dirt or mud which may cling to the fruit thereby partially cleaning the fruit.

The draper 30 is formed from a sheet of flexible material such as canvas, plastic belting, or the like which has its lower end anchored to an angle member 132 (FIG. 2) that is secured to and extends transversely across the pickup elevator frame 24, and has its upper end similarly anchored to an angle member 134 (FIG. 2) that is secured to and extends transversely across the sub-frame 74. A plurality of spaced slots 136 (only one being shown in FIGS. 2, 8 and 9) are formed in the draper 30 near its upper end.

A plurality of series of independently suspended weights 138 (FIGS. 2, 6 and 7) are supported by arms 139 pivoted on rods 140 that are secured to brackets 142 that extend transversely of the elevator and are secured to adjacent frame members 143. It will be noted that the weights 138 bear against the draper 30 and are pivotally supported at their forward ends. The point of contact of each weight against the draper not only provide sufficient force to cause the fruit to roll, but also serves as a one-way gate which allows the fruit to move upwardly therepast but prevents the fruit from moving down past the independently suspended weights 138.

After being rolled up the elevator 22, the partially cleaned fruit F moves into the trash separator 34 (FIGS. 2, 8 and 9) for further cleaning. The trash separator includes the previously mentioned clamping roller 32 which has a peripheral surface and is supported by a shaft 45. The shaft 45 is journaled on the free end of a pair of arms 146 that have their opposite ends pivoted at 147 by bolts to the side wall 148 of the sub-frame 74 in axial alignment with a jack shaft 150. The side walls 148 are apertured at 151 (FIG. 8) to permit the ends of the shaft 45 to extend outwardly of the side walls 148. Springs 152 are connected between the free ends of the arms 146 and a portion of the sub-frame 74 to urge the clamping roller 32 against the elevator as it moves around the upper elevator pulley 114. In order to guide debris such as twigs and grass between the clamping roller 32 and the elevator, a plurality of curved hold-down fingers 156 (FIGS. 8 and 9) are independently suspended for pivotal movement on a rod 158 extending transversely of and secured to the sub-frame 74. The fingers 156 extend through the slots 136 in the draper 30 and have free ends which curve around the upper portion of the elevator pulley 114 to hold the debris against the elevator. As best shown in FIG. 9, the hold-down fingers 156 are spaced apart a distance greater than the diameter of the fruit F thereby permitting the fruit along with other debris to gravitate over the upper end of the elevator 22 onto the cleaning belt conveyor 36, while the twigs, grass, and the like are gripped by the clamping roller 32 and discharged directly upon the ground.

The cleaning belt conveyor 36 (FIGS. 2 and 8) includes a pivotal sub-frame 159 and is trained around an upper roller 160 keyed to a shaft 162, and a lower roller 164 keyed to a shaft 166. The upper shaft 162 is journaled on the sub-frame 74 and has the upper end of the conveyor sub-frame 159 journaled thereon. The lower shaft 166 is journaled only on the conveyor sub-frame 159 thus allowing the conveyor 36 to be pivoted about the shaft 162 by a hydraulic cylinder 167 connected between the sub-frame 74 and the conveyor sub-frame 159. The upper run 38 of the conveyor 36 is driven upwardly, and is upwardly and forwardly inclined. The inclination of the conveyor 36 may be varied by actuation of the hydraulic cylinder 167 to pivot the conveyor to any inclination within the range of about 10° to 30°. The dirt, debris, and defective fruit such as damaged or partially rotted fruit which resists rolling, is advanced up the conveyor 36 and is discharged off the upper end thereof onto the ground. The rollable fruit F rolls off the lower end of the cleaning belt onto the cross-bar or drag bar elevator 40. When the conveyor 36 is moved to its low inclination position a section of belting 170 carried by the frame 159 aids in guiding the fruit into the elevator 40.

The drag bar elevator 40 (FIG. 2A) includes the two piece frame 76 with the lower portion 172 being rigidly secured to the chassis 26, and with the upper portion 173 being pivoted at 78 to the lower portion. The elevator 40 comprises a plurality of spaced cross-bars 176 which are connected to spaced parallel endless chains 178 that are trained around lower sprockets 180 keyed to a shaft 182 journaled in the lower frame portion 172, and upper sprockets 184 keyed to a shaft 186 journaled on the upper portion 173 of the frame 76. The cross bars 176 advance the fruit F, along with any remaining debris, upwardly over the screen 46 causing the small debris to sift through the screen. The cleaned fruit then gravitates over the upper end of the drag bar elevator 40 onto the loading conveyor 47 for conveyance to the chute 48 and discharge into the bulk bin of the truck T.

The loading conveyor 47 is mounted on a loading conveyor frame 190 which is pivotally supported on a conveyor shaft 192 journaled in brackets 194 projecting downwardly from the upper portion 173 of the elevator frame 76. The conveyor 47 includes an endless belt 196 having cross-bars 198 thereon. The belt 196 is trained around a roller 200 keyed to the shaft 192 and another roller 202 keyed to a shaft 204 journaled on the conveyor frame 190.

The chute 48 is pivotally attached to the discharge end of the loading conveyor frame 190 by pivot pins 206. The chute includes a bottom wall 210 and side walls 212 which are notched at 214 to preclude interference with the shaft 204 and its bearings. As indicated in dotted lines in FIG. 2A when the pickup machine 20 is to be moved from place to place, the adjustable portion 173 of the elevator 76 is pivoted upwardly to a substantially vertical position, the loading conveyor 47 is pivoted downwardly to a substantially vertical position, and the chute 48 is pivoted upwardly and is locked in place by any suitable connecting means such as a spring loaded pin 216.

A drive mechanism 220 (FIG. 10) is provided for driving the several components of the pickup machine 20 from the power take-off 54 of a tractor 53 that is coupled to and pulls the pickup machine along the windrow of fruit to be picked up.

The drive mechanism 220 comprises a telescoping drive shaft 224 coupled to the power take-off 54 and an input shaft 226 by universal joints 228. A chain drive 230 connects the input shaft 226 to an elongated drive shaft 232 that is connected to the input of a gear box 234 by universal joints 236 and an intermediate shaft 238. The output shaft 240 of the gearbox 234 is connected by a chain drive 242 to the jackshaft 150. The jackshaft 150 is connected to and drives the elevator or head shaft 116 by a pair of chain drives 152 located at opposite ends of the shafts 150 and 116. Thus the upper run of the elevator 22 is driven upwardly, or clockwise, as indicated by the arrows in FIG. 10.

In order to drive the clamping or devining roller 32 and the cleaning conveyor 36 in the opposite or clockwise direction, a multiple sprocket unit 244 is journaled on the jackshaft 150. The sprocket unit 244 is driven by an endless chain 246 that is driven by a sprocket 248 keyed to the shaft 116. The chain 246 also drives a sprocket 250 of the multiple sprocket unit 244, an idler sprocket 252, and a sprocket 254 keyed to the drive shaft 162 of the cleaning conveyor. Thus, the devining roller 32 and the cleaning conveyor 36 are driven in the directions indicated by the arrows in FIG. 10.

The cross-bar elevator 40 is driven from the shaft 116 by a double belt drive 256 which includes a pulley 258 keyed to the shaft 116, a pulley 260 keyed to an intermediate shaft 262 journaled on the movable portion 173 (FIG. 2A) of the elevator frame 76 and a pair of endless belts 264 (FIG. 10) trained around the pulleys 258 and 260. A chain drive 266 is connected between the shaft 262 and the elevator driveshaft 186 thus driving the upper run of the elevator 40 upwardly as indicated in FIG. 10.

The loading conveyor 47 is driven by a chain drive 268 connected between the shaft 186 and the shaft 192 of the conveyor 47. Also, a chain drive 270 interconnects the shafts 192 and 204 to provide a pull on the upper run of the loading conveyor 47.

In operation, the article pick-up machine 20 of the present invention, when used in a citrus harvesting operation, is first coupled to the drawbar of a tractor 53 for towing, is coupled to the power take-off shaft 54 for providing rotary power to drive the mechanical parts of the machine 20, and is coupled to the hydraulic system of the tractor for providing hydraulic fluid under pressure to the several hydraulic components of the machine. The operator then drives the machine into a citrus grove which has previously had the fruit F shaken from the trees and raked into windrows. While driving to the grove, the machine has the cross-bar elevator 40, the loading conveyor 47 and the chute 48 held in their substantially vertical transport positions as illustrated in dotted lines in FIG. 2A by the hydraulic cylinders 71 and 72, respectively. Steering at this time and during the pickup operation may be aided by selectively controlling hydraulic cylinder 58 (FIG. 1A). Also, during this time the pickup elevator 22 is raised off the ground by hydraulic cylinder 68 (FIG. 2).

When in position to commence the pickup operation, the several components are hydraulically moved to their full line pickup positions illustrated in FIGS. 2 and 2A. Also, the chute 48 is placed in its operative position and a truck T is driven behind the vehicle for collecting the fruit. The hydraulic cylinder 68 of the pickup elevator 22 are then placed in neutral, the power take-off is engaged, and the machine is driven along the windrow. The fruit is moved upwardly between the elevator 22 and the draper 30 at which time the resistance imparted to the fruit by the draper causes the fruit to rotate to dislodge debris therefrom. Also, the weights 138 bear against the draper 30 to permit upward movement of the fruit but preclude downward movement thereof. Some debris carried up the elevator falls through the elevator bars 110. Long or stringy debris is clamped between the devining roller 32 and the elevator 22 and, accordingly, is removed from the system by being discharged upon the ground. Still other debris, including defective fruit which resists rolling, falls onto the inclined cleaning conveyor 36 and is conveyed off the upper end thereof. The remaining marketable fruit gravitates off the lower end of the cleaning conveyor 36 and falls into the cross-bar elevator 40. The elevator 40, loading conveyor 47 and chute 48 then discharge and spread the clean fruit into the bulk body of the truck T.

From the foregoing description it is apparent that the article pickup machine of the present invention includes an improved mounting for a pickup elevator frame which permits the use of a rigid elevator frame yet allows the forward end of the pickup elevator to freely follow the ground contour. Also, the machine includes means for controlling the movement of the articles up a steeply inclined elevator, while partially cleaning the same, and includes additional cleaning means which not only removes dirt and debris from the system but also removes defective articles that resist rolling.

Although the best mode contemplated for carrying out the present invention has been herein shown and described, it will be apparent that modification and variation may be made without departing from what is regarded to be the subject matter of the invention.

What I claim is:

1. A pickup machine movable along a predetermined path over a surface which supports articles to be picked up and which varies in contour both longitudinally and transversely of the path of movement of the machine, comprising a mobile main frame, a rigid downwardly and forwardly inclined elevator frame having a forward and a rear end, ground engaging means on only the forward end of the elevator frame for following the varying contour of the supporting surface, article pickup means on said rigid elevator frame and having a lower forward edge in position to pick up articles and deliver the articles over the rear upper end of the elevator frame, and means for pivotally connecting the upper rear end of the rigid elevator frame to the main frame at a fixed vertical position while allowing the elevator frame to freely pivot relative to the main frame about a predetermined longitudinal axis and transverse axes intersecting the longitudinal axis in response to the varying contour of the article supporting surface, said pivotal connecting means including means defining a swivel joint pivotally connecting the upper end of said rigid frame to said main frame at a point near the transverse midpoint of said frames.

2. A pickup machine according to claim 1 wherein said article pickup means includes an endless driven elevating means.

3. A pickup machine according to claim 2 wherein said driven elevating means includes a steeply inclined driven endless pickup elevator having spaced transversely extending article supporting bars, and stationary means connected to said rigid elevator frame for holding the articles firmly against said bars to permit upward movement thereof but preclude downward movement and to cause the articles to roll during upward movement to loosen debris therefrom.

4. A pickup machine movable along a predetermined path over a surface which supports articles to be picked up and which varies in contour both longitudinally and transversely of the path of movement of the machine, comprising a mobile main frame, a rigid downwardly and forwardly inclined elevator frame having a forward and a rear end; ground engaging means on the forward end of the elevator frame for following the varying contour of the supporting surface; article pickup means on said elevator frame and having a lower forward edge in position to pick up articles; and means connecting the upper rear end of the rigid elevator frame to the main frame while allowing the elevator frame to freely shift relative to the main frame in response to the varying contour of the article supporting surface; said elevator frame and said main frame each including side portions, said connecting means comprises a pair of radius rods each pivotally connecting a side portion of said elevator frame to a side portion of said main frame, and means defining a longitudinally movable swivel joint connecting the main frame to said elevator frame at a point intermediate the sides thereof.

5. A pickup machine according to claim 4 wherein said swivel joint means includes means defining a yoke having an elongated slot therein on one of said frames, means defining a ball socket on the other of said frames, a ball segment slidably received in said ball socket, and means slidably connecting said ball segment to said slot for sliding movement therein in response to pivotal movement of said radius rods.

6. A pickup machine according to claim 5 wherein the pivot axis of said ball socket, and the pivot axes of said radius rods all lie in a plane that is common with the plane containing the longitudinal axis of said slot when the radius rods are parallel.

7. A pickup machine according to claim 6 wherein said plane is horizontal.

8. A pickup machine according to claim 5 wherein said ground engaging means are a pair of wheels, and wherein transverse variations of the contour of the article supporting surface causes the radius rods to counter swing, and causes the ball segment and the socket to move longitudinally of said slot.

9. A pickup machine according to claim 1 wherein said articles are rollable articles and wherein said pickup means includes a driven endless elevator having transversely spaced article supporting cross bars thereon for moving the articles upwardly, and additionally comprising a stationary flexible draper, means for anchoring one end of the draper to said rigid elevator frame in position to engage the upper surfaces of the articles for causing the articles to roll up the elevator at a speed substantially one-half the speed of the elevator.

10. A pickup machine according to claim 9 and additionally comprising force applying means connected to said rigid elevator frame for bearing against said draper and movable to allow the articles to roll upwardly therepast while precluding movement of the articles downward therepast.

11. A pickup machine movable along a predetermined path over a surface which supports rollable articles to be picked up, comprising a mobile vehicle, a steeply inclined elevator frame connected to the vehicle and having a forward and a rear end, ground engaging means on the forward end of the elevator frame for following the contour of the article supporting surface, an endless elevator having a driven upper run supported on said elevator frame for picking up and conveying the rollable articles upwardly, a flexible draper, means for anchoring one end of the flexible draper to said elevator frame above said upper run in position to engage the upper surfaces of the articles for causing the articles to roll as said upper run moves said articles upwardly at a speed approximately one-half the speed of the conveyor for cleaning the articles and dislodging debris therefrom.

12. A pickup machine according to claim 11 wherein said elevator includes spaced bars for supporting the articles and for allowing debris to fall therethrough.

13. A pickup machine according to claim 11 and additionally comprising force applying means pivoted to said elevator frame and bearing against the draper for applying an additional force on said draper.

14. A pickup machine according to claim 11 wherein said anchoring means anchors both ends of said draper with one end anchored to the elevator frame and with the other end anchored to the vehicle.

15. A pickup machine according to claim 13 wherein said force applying means includes a plurality of weights bearing against the upper surface of said draper and pivotally supported to said elevator frame at pivot points forwardly of the points of contact of the weights with said draper.

16. A pickup machine according to claim 3 wherein the articles picked up are rollable articles mixed with debris, and additionally comprising head roll means around which the rear end of said elevator is trained, and a trash separator supported on said main frame; said trash separator comprising a debris clamping roll, movable support means urging said clamping roll against a portion of said elevator adjacent said head roll means for gripping large debris therebetween and removing the large debris from the path of movement of the article, an upwardly inclined endless belt conveyor means having an upper run disposed in position for receiving the articles and fine debris discharged from said elevator, means for driving said elevator conveyor means in a direction wherein said upper run moves upwardly to carry the fine debris and defective articles which resist rolling over the upper end of the conveyor means for discharge therefrom, the inclination of said conveyor means being sufficient to allow the nondefective articles to roll over the lower end of the conveyor means for collection.

17. A pickup machine according to claim 16 and additionally including means connected between said main frame and said endless belt conveyor means for varying the inclination of said endless belt conveyor means.

18. A pickup machine adapted to be towed by and to receive power from a powered towing unit comprising; a mobile vehicle having a chassis, means adapted to connect the forward end of said vehicle chassis to the towing unit, a pair of wheels supporting the rear end of said chassis, a pickup elevator frame, ground engaging means on the forward end of said pickup frame for following the undulations of the ground, means connecting the rear end of the frame to the vehicle chassis for universal movement, a driven pickup elevator on said frame for collecting rollable articles along with debris from the ground for conveyance by the elevator, said elevator having an upper head roll, stationary draper means disposed on said frame over the elevator and adapted to bear against collected articles for rolling the articles on said elevator to frictionally dislodge debris therefrom as the elevator is moving upwardly, a debris clamping roll resiliently urged against said elevator as it passes around said head roll to grip and dislodge large stringy debris from the articles, means defining a driven reverse flow inclined endless cleaning conveyor mounted on said chassis having an upper end and a lower end and an article supporting surface, the article supporting surface adjacent the upper end being disposed in position to receive the articles and remaining debris from the elevator, said cleaning conveyor means having its supporting surface driven upwardly at a rate sufficient to carry debris and defective articles which resist free rolling off the upper end thereof while allowing the readily rollable articles to roll off the lower end thereof, and a driven drag bar discharge elevator mounted on said chassis in position for collecting the readily rollable articles and remaining debris, and frame means supporting said discharge elevator on said chassis including a perforated screen against which the articles roll and through which remaining debris is discharged.

19. A pickup machine according to claim 18 and additionally comprising means connected between the cleaning conveyor and the chassis for varying the inclination of said cleaning conveyor.

20. A pickup machine according to claim 18 and additionally comprising a loading conveyor pivotally connected to the upper end of said discharge elevator frame; and power actuated means connected between the pickup elevator frame and chassis for raising the forward end of said pickup elevator frame off the ground from the ground engaging pickup position to a transport position, second power actuated means connected between said chassis and said discharge elevator for pivoting said discharge elevator from a rearwardly inclined operative position to a substantially vertical transport position, and third power actuated means connected between said discharge elevator and said loading conveyor for pivoting said loading conveyor downwardly from a bulk loading position to a substantially vertical transport position.

21. A pickup machine according to claim 19 and additionally comprising means connecting between said chassis and said rear wheels for steering said rear wheels to aid in the mobility of the vehicle.

22. A pickup machine according to claim 20 and additionally including a chute removably mounted on the output end of said loading conveyor and operable to aid in spreading the articles during gravitational discharge thereof.

* * * * *